United States Patent [19]

Barten et al.

[11] 4,356,436

[45] Oct. 26, 1982

[54] PICTURE DISPLAY DEVICE

[75] Inventors: Piet G. J. Barten; Johannes J. Bos, both of Eindhoven, Netherlands

[73] Assignee: U.S. Philips Corporation, New York, N.Y.

[21] Appl. No.: 185,821

[22] Filed: Sep. 10, 1980

[30] Foreign Application Priority Data

Sep. 13, 1979 [NL] Netherlands ............... 7906832

[51] Int. Cl.³ ............................................. H01J 29/52
[52] U.S. Cl. ............................. 315/386; 358/168
[58] Field of Search ....................... 315/386; 358/168

[56] References Cited

U.S. PATENT DOCUMENTS

| | | | |
|---|---|---|---|
| 2,453,711 | 11/1948 | Isbister et al. | 315/386 |
| 2,678,964 | 5/1954 | Loughlin | 315/386 X |
| 2,917,659 | 12/1959 | Knoebel | 315/386 |
| 2,993,142 | 7/1961 | Harvey | 315/386 |

*Primary Examiner*—Malcolm F. Hubler
*Attorney, Agent, or Firm*—Thomas A. Briody; William J. Streeter; Laurence A. Wright

[57] ABSTRACT

A picture display device in which velocity modulation of the electron beam is effected with a deflection correction signal derived from the video signal to be displayed. The brightness distribution influenced by this deflection correction signal in a sudden brightness transient is corrected by adding to the video signal a brightness correction signal which is predominantly proportional to the product of the video signal and a first derivative with respect to time of the deflection correction signal.

7 Claims, 6 Drawing Figures

PICTURE DISPLAY DEVICE

The invention relates to a picture display device for displaying a video signal on a picture screen of an electron beam type picture display tube to be scanned by means of a deflection circuit.

BACKGROUND OF THE INVENTION

U.S. Pat. No. 2,678,964; FIGS. 7 and 8 in particular and the associated description, describes a picture display device of the above mentioned type wherein there is added to the video signal a brightness correction signal which is fed forward or not by way of a threshold circuit and which is a first derivative with respect to time of a deflection correction signal. Compared with the deflection required for normal picture scanning the deflection correction signal furnishes an additional deflection which is substantially proportional to the amplitude of the deflection correction signal. The steepness of sudden brightness transients is increased thereby, but an unwanted brightness modulation of the picture screen takes place in the form of an exaggeration of brightness differences in sudden transients (overshoot) which must be compensated for by the brightness correction signal. This compensation reduces the maximum electron beam current in sudden brightness transients and improves the sharpness of the displayed picture. This compensation appeared to be incomplete.

OBJECT OF THE INVENTION

It is an object of the invention to make this compensation substantially complete.

SUMMARY OF THE INVENTION

According to the invention, a picture display device of the type described in the opening paragraph is therefore characterized in that the brightness correction signal generating circuit comprises a multiplier to which the video signal and a signal which is predominantly proportional to the first derivative with respect to time of the deflection correction signal are applied, so that the brightness correction signal is predominantly proportional to a product of the video signal and the first derivative with respect to time of the deflection correction signal. This measure ensures a faithful display of sudden brightness transients.

BRIEF DESCRIPTION OF THE DRAWINGS

The invention will now be further explained by way of example with reference to the accompanying drawing wherein.

DETAILED DESCRIPTION OF THE PREFERRED EMBODIMENTS

Figure 1:
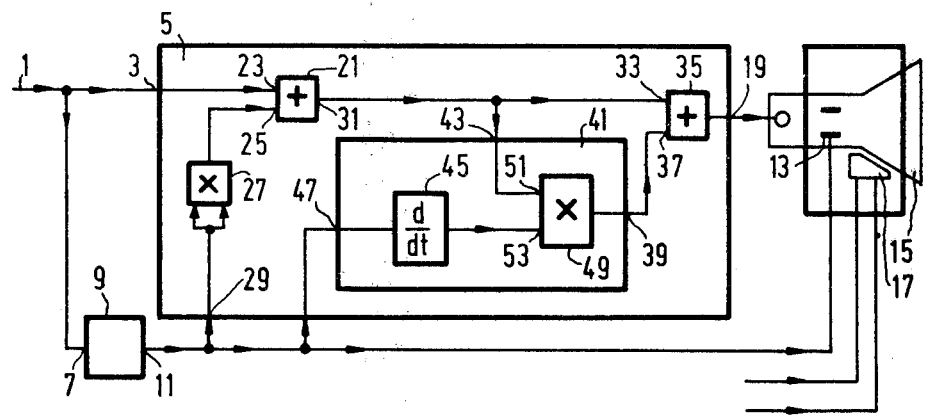
FIG. 1 illustrates by means of a block schematic circuit diagram a picture display device according to the invention.

In FIG. 1 a video signal to be displayed is applied to an input 1. The input 1 is connected to an input 3 of a video signal processing circuit 5 and to an input 7 of a deflection correction signal generating circuit 9. The deflection correction signal generating circuit 9 supplies at an output 11 a deflection correction signal which, in the present case, is a deflection correction voltage, which is applied to an auxiliary deflection electrode 13 of a picture display tube 15. By means of a deflection circuit 17, the picture screen of the picture display tube 15 is scanned in a conventional manner by deflection of an electron beam as is customary in, for example, television display. The deflection correction signal at the auxiliary deflection electrode 13 produces, compared with this deflection for the normal scanning an additional deflection, which is usually called velocity modulation and which is here called deflection correction.

The video signal processing circuit 5 has an output 19 from which a corrected video signal is obtained, which is applied to an electrode which controls the beam current strength of the picture display tube 15.

The degree of brightness with which the beam current causes the picture screen to light up is therefore influenced by the video signal at the output 19 of the video signal processing circuit 5 and the deflection correction signal at the main electrode 13. For practical reasons, the influence of the deflection correction signal is limited to the immediate vicinity of sudden video signal transients, caused by the video signal at the input 3 of the video signal processing circuit 5. This is realized by using for the deflection correction signal generating circuit 9 a circuit which is supplied by way of its input predominantly with the first derivative with respect to time from the video signal. This may be effected by means of, for example, a differentiating network or by means of the difference between an input and an output signal from a delay line which has a short time delay.

The deflection correction signal increases the scanning velocity of the electron beam at the beginning of a positive-going and at the end of a negative-going sudden brightness transient and reduces the scanning velocity at the end of a positive-going and at the beginning of a negative-going sudden brightness transient. The control of the brightness of the electron beam is partly effected by the deflection correction signal, so that the video signal in the bright portions of the sudden brightness transients may have a smaller amplitude causing the beam current to be weaker in those instants than for the case where there is no deflection correction signal, and the sharpness of the displayed picture is improved. Decreasing the amplitude of the video signal is realised by a brightness correction signal which is added in the video processing circuit 5 to the video signal. How this brightness correction signal is generated will be described hereinafter.

The deflection correction signal causes an unwanted shift of the position of sudden brightness transients on the picture screen, which can be corrected for by shifting the position of the sudden transients in the time in the video signal. This is realised by means of a position correction signal which is added in an adder circuit 21 to the video signal applied to an input 23 of this adder circuit. This position correction signal is applied to an input 25 of the adder circuit 21, this position correction signal being obtained by squaring by means of a multiplying circuit 27 a signal which is predominantly proportional to the deflection correction signal which is applied to the multiplying circuit 27 by way of an input 29 of the video signal processing circuit 5.

A time-corrected video signal which is applied to an input 33 of a further adder circuit 35 is obtained from an output 31 of the adder circuit 21. From an output 39 of a brightness correction signal generating circuit 41 another input 37 receives a brightness correction signal which is predominantly proportional to a product of the video signal, applied to an input 43 thereof, and the first derivative with respect to time of the deflection correction signal obtained by way of a differentiating circuit 45 from an input 47 which is connected to the output 11 of the deflection correction signal generating circuit 9. This product is formed in a multiplying circuit 49 an input 51 of which is connected to the input 43 of the brightness correction signal generating circuit 41 and an input 53 of which is connected to an output of the differentiating circuit 45.

As a result thereof the brightness correction signal has at the beginning of a sudden brightness transient a more advantageous amplitude ratio than at the end thereof, compared with the case where only a brightness correction signal which is predominantly proportional to the first derivative with respect to time of the deflection correction signal were used, as has been customary so far. This more advantageous ratio results in a faithful reproduction of sudden brightness transients. Adding the brightness correction signal obtained in the above-described manner to the video signal obtained from the adder circuit 35 and applied to the output 19 of the video signal processing circuit causes such a ratio between the beam current and the so-called scanning velocity that the intensity of the lighting up of the picture screen is substantially proportional to the theoretically desired value of the video signal amplitude to the power gamma, wherein gamma is the exponent of power with which the picture display tube beam current depends on the voltage at the control electrode thereof.

The differentiating circuit 45 may be, for example, a differentiating network or a circuit producing the difference between the signals at the input and at the output of a delay line having a very short time delay. It should be noted that, as known, delay lines having different-producing circuits to form derivatives with respect to time have more advantageous noise properties than differentiating networks. In addition, the use of differentiating circuits with delay lines renders it possible to produce a deflection correction signal in a simple way for deflection correction into the vertical direction, accompanied by the associated position and brightness correction in the video signal when a time delay of, for example, one line period is used in the differentiating circuit instead of the above-mentioned short time delay as required for a horizontal correction.

Figure 2:
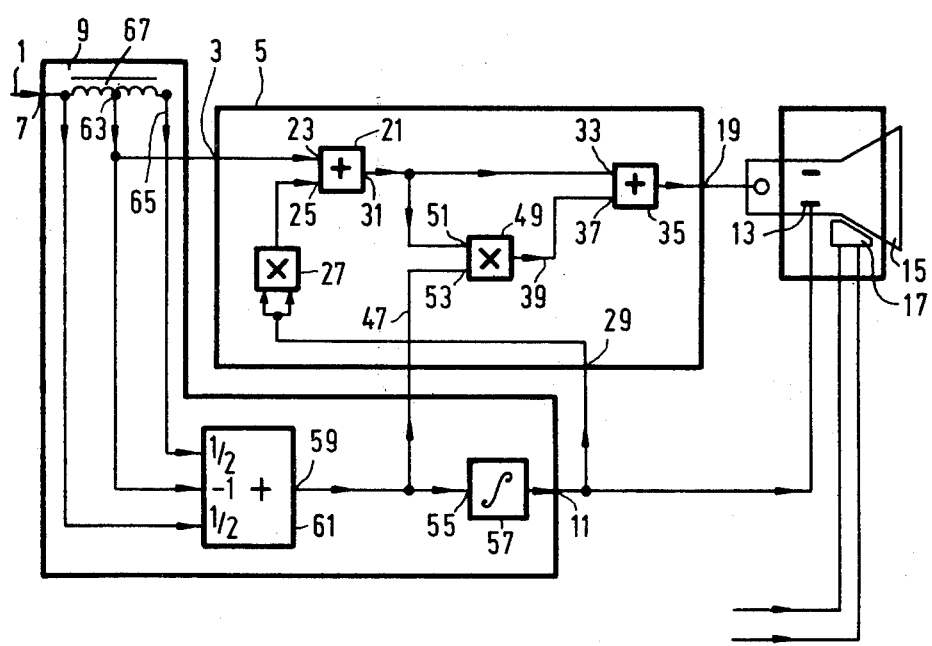
FIG. 2 illustrates also by means of a block schematic circuit diagram another possible embodiment of a picture display device according to the invention.

Components in FIG. 2 which correspond to components in FIG. 1 have been given the same reference numerals. In FIG. 2 the brightness correction signal generating circuit is formed exclusively by the multiplier 49. The signal for the further input 53 of the multiplier 49 is not obtained from the output 11 of the deflection correction signal generating circuit 9, as was the case in FIG. 1, but from an input 55 of an integrator 57 preceding that output 11. This input 55 of the integrator 57 is further connected to an output 59 of a transversal filter formed by a summing circuit 61, in which signals coming from an input connected to the input 7, a centre tap 63 and an output 65 of a delay line 67 are added together in an amplitude ratio $\frac{1}{2}$, $-1$, $\frac{1}{2}$. For low frequencies this substantially corresponds to the formation of a signal which is proportional to a second derivative with respect to time of the video signal applied to the input 7. At the output 11 of the deflection correction signal generating circuit 9 there then appears a signal which, for low frequencies, is substantially proportional to first derivatives with respect to time of the video signal.

Figure 3:
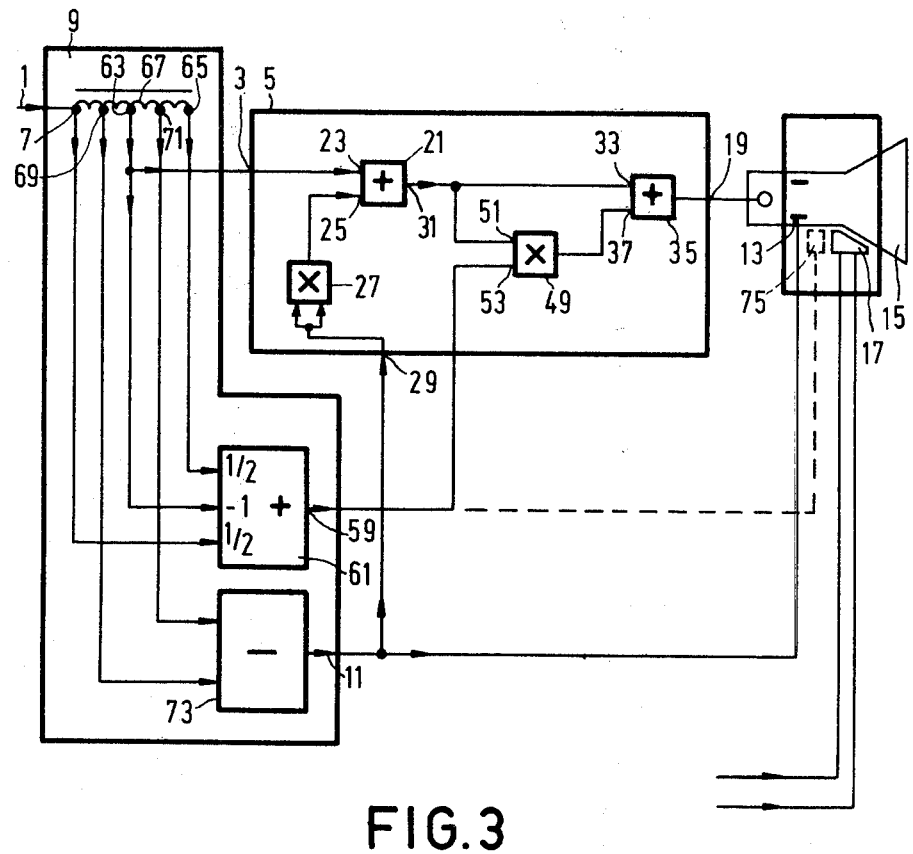
FIG. 3 illustrates by means of a block schematic circuit diagram a further possible embodiment of a picture display device according to the invention.

Corresponding components in FIG. 3 has been given the same reference numerals as in FIG. 1 and FIG. 2. The delay line 67 has two further taps 69 and 71, which are connected to inputs of a subtracting circuit 73, the output of which is connected to the output 11 of the deflection correction signal generating circuit 9. So in this FIG. 3, the deflection correction signal is obtained via a different path than the signal for the further input 53 of the multiplier 49. For low frequencies the deflection correction signal is substantially proportional to the first derivative with respect to time of the video signal and the signal at the further input 53 of the multiplier is substantially proportional to the derivative with respect to time of the deflection correction signal.

A dotted line indicates a possible circuit for the case where the deflection correction should be effected electromagnetically, so by means of a deflection correction coil 75. The deflection correction signal is then a current the value of which has become predominantly proportional to the first derivative with respect to time of the video signal.

When the inductance of the deflection correction coil is large with respect to its resistance, the voltage across that coil becomes for a low frequency predominantly the second derivative with respect to time of the video signal and may therefore be taken from the output 59 of the summing circuit 61.

An advantageous value of the time delay between the input 7 and the output 65 of the delay line 67 for the processing of a video signal of a television signal is 360 n sec. The taps 69 and 71 may be provided substantially halfway between the taps 7 and 63 and between 63 and 65, respectively.

Figure 4:
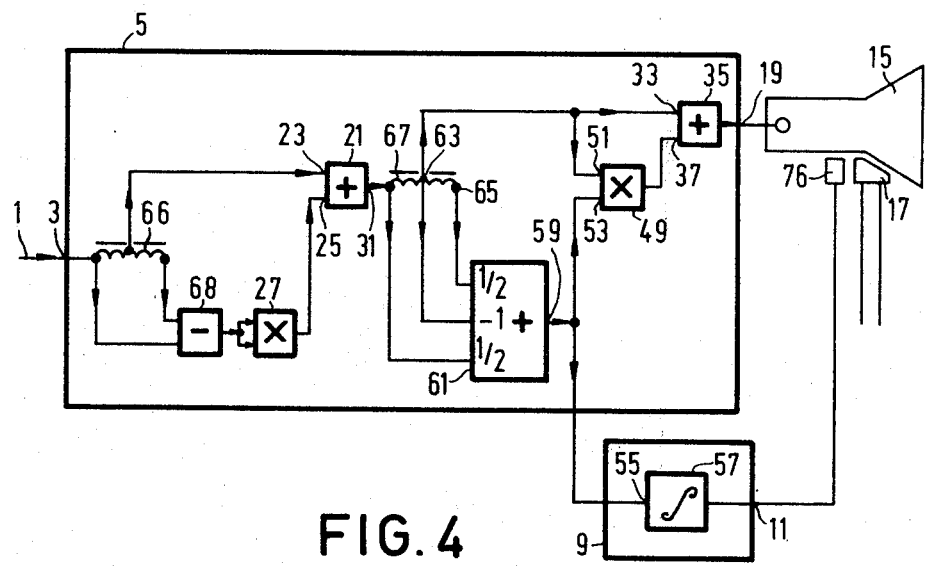
FIG. 4 illustrates by means of a block schematic circuit diagram a possible embodiment of a picture display device according to the invention.

In FIG. 4, in which corresponding components have been given the same reference numerals as in the first three Figures, the position of the video signal applied to the input 3 of the video signal processing circuit is first corrected in the adder circuit 21. This is done by applying a signal of the squaring multiplying circuit 27, this signal having been obtained by means of a delay line 66 and a subtracting circuit 68, to the input 25 of the adder circuit 21.

From the position-corrected video signal obtained from the output 31 of adder circuit 21, a correction signal is obtained in the manner described above at the output 11 of the deflection correction signal generating circuit 9 in the form of a current which is sent through a deflection correction coil 76, which causes a deviation from the normal picture scan proportional to that current.

Figure 5A:
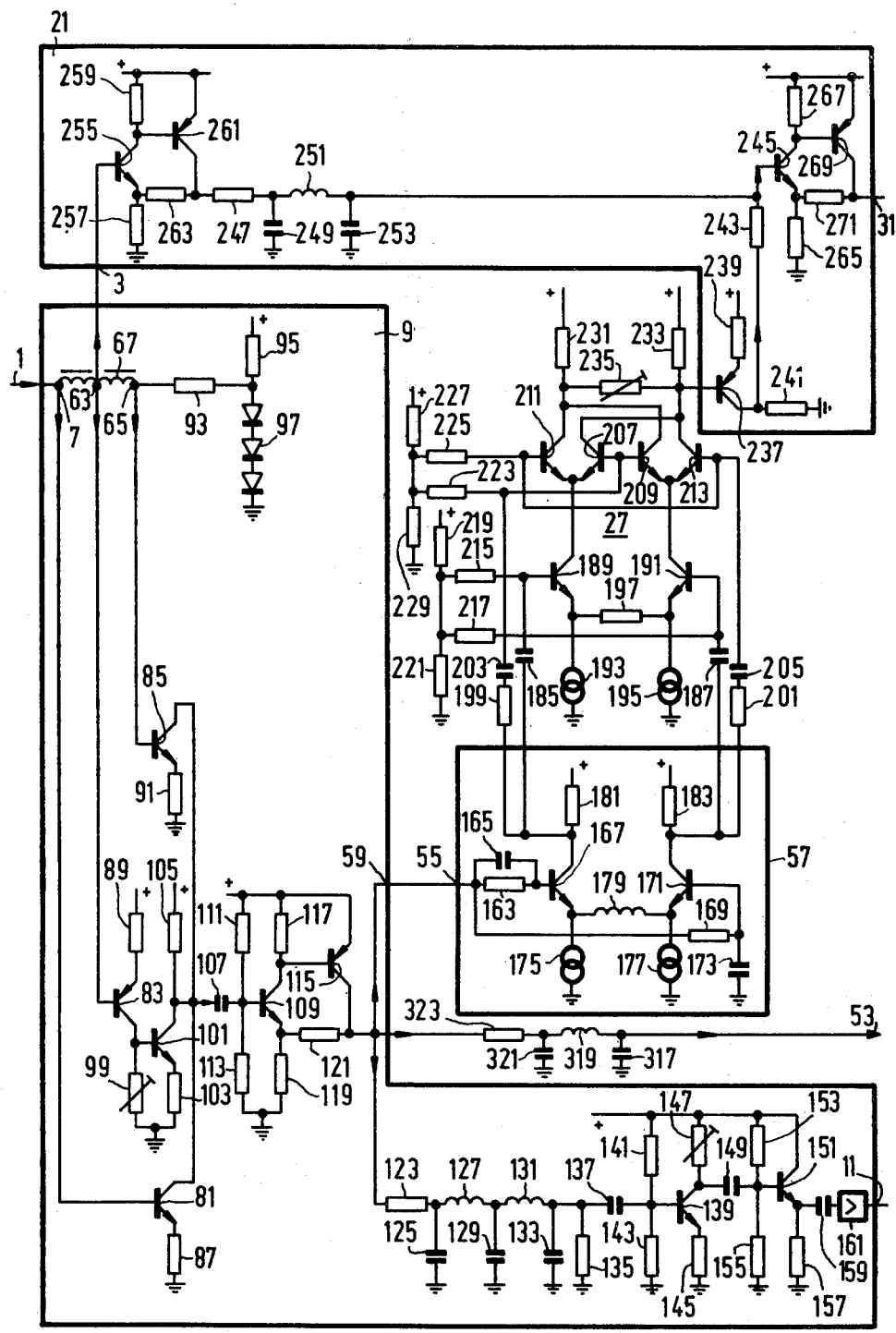
FIGS. 5a and 5b illustrates, for the major part by means of a circuit diagram, a picture display device according to the invention.
Figure 5B:
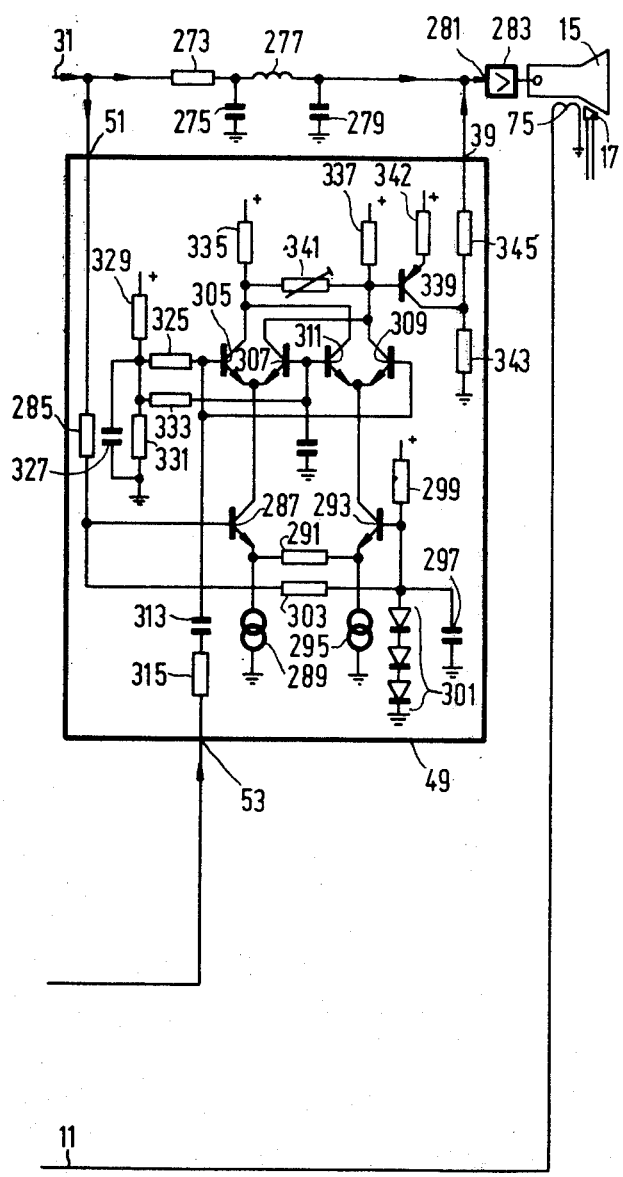

Corresponding components in FIG. 5 have been given the same reference numerals as in the preceding Figures.

In the deflection correction signal generating circuit 9 the respective taps 7, 63 and 65 of the delay line 77 are connected to the base of an npn transistor 81, the base of a pnp transistor 83 and the base of an npn transistor 85, respectively. Unless indicated differently, the npn transistors in the circuit are of the type BF240 and the pnp transistors of the type BF324. The transistors 81, 83 and 85, respectively, have an emitter resistor 87, 89 and 91, respectively, each having a value of 2200Ω. By way of an 1100Ω terminating resistor 93 the tap 65 of the delay line 67 is connected to a series arrangement 97 of three diodes which are fed by a 3300Ω resistor 95. The collector of the transistor 83, which operates as a polarity reversing stage, is connected to ground by way of a 560Ω variable resistor 99 and is further connected to the base of a pnp transistor 101 which has a 220Ω emitter resistor 103 and a 150Ω collector resistor 105. The collectors of the transistor 81, 101 and 85, which operate as an amplifier are interconnected to form a summing circuit. By way of a 10 nF capacitor 107 they are connected to the base of an npn transistor 109, which is further connected to the positive 9 V voltage by way of a 15 kΩ resistor 111 and to ground by way of a 6800Ω resistor 113. The collector of the transistor 109 is connected to the base of a transistor 115, which operates as an amplifier and to the positive voltage by way of a 1 kΩ resistor 117. The transistor 109 has a 1 kΩ emitter resistor 119 and the transistor 115 and a 1500Ω collector resistor 121. This collector resistor 121 is connected to the emitter of the transistor 101. The transistors 109 and 115 are part of a complementary amplifier having a high input impedance and a low output impedance and a gain factor equal to $$(R121 + R119)/R121$$

A voltage from which a current which is to be sent into the deflection correction coil 75 as the deflection correction signal, is obtained from the collector of the transistor 115 by way of an output 11. The voltage for the output 11 which is predominantly proportional for low frequencies to the second derivative with respect to time of the video signal is applied to a 10 nF coupling capacitor 137 via a time delay correction circuit including a resistor 123 of 1000Ω, a capacitor 125 of 12 pF, a coil 127 of 30 µH, a capacitor 129 of 33 pF, a coil 131 of 30 µH, a capacitor 133 of 12 pF and a resistor 135 of 1800Ω, the other terminal of this coupling capacitor being connected to the base of npn transistor 139, which is further connected to the positive voltage by way of an 18kΩ resistor 141 and to ground by way of a 2.7 kΩ resistor 143. The transistor 139 operates as an amplifier and has a 120Ω emitter resistor 145 and a variable collector resistor 147 of 470Ω. By way of a coupling capacitor 149 the collector of this resistor is connected to the base of an npn transistor 151 which operates as an emitter follower. This base is further connected to the positive voltage by way of a resistor 153 of 10kΩ and to ground by way of a resistor 145 of 10 kΩ. The emitter resistor 157 of the npn transistor 151 has a value of 3300Ω.

By way of a coupling capacitor 159 of 10 nF the output voltage of the emitter follower 151 is applied to an amplifier 169, which supplies the deflection correction current for the deflection correction coil 75 from its output 11. The integrating operation of the deflection correction coil causes this current to become predominantly proportional for low frequencies to the first derivative with respect to time of the video signal as the signal applied to the amplifier 161 is predominantly proportional for low frequencies to the second derivative with respect to time of the video signal.

The signal from the collector of the transistor 115, which is predominantly proportional for low frequencies to the second derivative with respect to time of the video signal and, consequently, to the first derivative, with respect to time of the deflection correction signal is applied to the input 55 of the integrator 57, via the output 59 of the deflection correction signal generating circuit 9.

The integrator 57 is formed by means of an integrated circuit of the type TCR 240, which comprises the transistors of this integrator. The input 55 is connected to the base of a transistor 167 by way of a parallel arrangement of a 1 kΩ resistor 163 and a 10 nF capacitor 165 and by way of a 1 kΩ resistor 169 to the base of a transistor 171, which is further connected to ground by way of a 10 nF capacitor 173. The emitter of the transistors 167, 171 are connected to current sources 175, 177 and are further interconnected by way of a coil 179 which has an inductance of 22 µH. Each collector of the transistors 177 and 171 is connected to the positive supply voltage by way of a resistor 181, 183 of 560Ω and produce the output voltages of the integrator in the opposite phase.

These output voltages are applied to the base of a transistor 189, 191 of the multiplier 27 by way of a capacitor 185 and 187, respectively, having a capacitance value of 10 nF. The transistors of the multiplier 27 are part of an integrated circuit TCA 240. The emitters of the transistors 189, 191 are connected to current sources 193, 195 and are further interconnected by way of a 470Ω resistor 197. The collectors of the transistors 167, 171 of the integrator 57 are further connected to the bases of two transistors 209, 207 and 211, 213, respectively, via a series arrangement of a resistor 199 and 201, respectively, which have a resistance value of 1500Ω, and a capacitor 203 and 205, respectively, which have a capacitance of 10 nF. The emitters of the transistors 207 and 211 are connected to the collector of the transistors 189 and the emitters of the transistors 209 and 213 are connected to the collector of the transistor 191. The bases of the transistors 189 and 191, respectively, are connected to a tap of a voltage divider having a 10 kΩ resistor 219 and a 6.8 kΩ resistor 221, by way of a resistor 215 and 217, respectively, which have a value of 2200Ω. The bases of the respective transistors 207, 209, 211 and 213 are connected to a tap of a voltage divider which has a 5.6 kΩ resistor 227 and a 18 kΩ resistor 229, by way of a resistor 223 and 225, respectively, which have a value of 68Ω. The collectors of the transistors 209 and 211 are interconnected and connected to the positive supply voltage by way of a 560Ω resistor 231. The interconnected collectors of the transistors 207 and 213 are connected to the positive supply voltage by way of a 560Ω resistor 233. A variable resistor 235 which has a value of 2200 is connected between the collectors of the transistors 209, 211 and 207 and 213. The collectors of the transistors 207, 213 apply a position correction voltage the amplitude of which can be adjusted by means of the resistor 235, to the adder circuit which is proportional to the square of the deflection correction signal. This voltage is applied to the base of a pnp transistor 237 the emitter of which is connected to the positive supply voltage by way of a 180Ω resistor 239 and the collector to ground, by way of a 560Ω resistor 241 and to the base of an npn transistor 245 via a 560Ω resistor 243. Furthermore, this base receives the video signal by way of a time delay correction network comprising a 1000Ω resistor 247, a 9 pF capacitor 249, a coil 251 having an inductance 27 µH and a 9 pF capacitor 253. This video signal is applied from the input 3 of the adder circuit 21 to the base of an npn transistor 255. This transistor 255 has an emitter resistor 257 of 1000Ω and a collector resistor 259 of 1000Ω. The collector is further connected to the base of an pnp transistor 261, which operates as an amplifier and the emitter of which is connected to positive supply voltage and the collector to the emitter of the transistor 255 by way of a 1000Ω resistor 263 and is further connected to the resistor 247. The transistors 255 and 261 and also the transistors 109 and 115 form a complementary amplifier.

This causes the transistor 245 to receive at its base the sum signal of the video signal and the position correction signal. The emitter of this transistor 245 is connected to ground by way of a 1000Ω resistor 265 and its collector is connected to the positive supply voltage by way of a 1000Ω resistor 267 and further to the base of a pnp transistor 269. The emitter of the transistor 269 is connected to the positive supply voltage and its collector to the emitter of the transistor 245 by way of a 1000Ω resistor 271 and is further connected to the output 31 of the adder circuit 21. The transistors 245 and 269 and also the transistors 109 and 115 form a complementary amplifier.

By way of a delay time correction network comprising a 1000Ω resistor 273, a 3.3 pF capacitor 275, a coil 277, having an inductance of 6.8 µH, and a 3.3 pF capacitor 279 the output 31 of the adder circuit is connected to an input 281 of a video output amplifier 283, which controls the picture display tube 15 by means of its cathode.

The output 31 of the adder circuit 21 is further connected to the base of a transistor 287 by way of the input 51 of the amplifier 49 and a 1500Ω resistor 285. The resistors of the amplifier 49 are part of an integrated circuit TCA 240. The emitter of the transistor 287 is connected to a current source 289 and by way of a 560Ω resistor 291 to the emitter of the transistor 293, which is further connected to a current source 295. The base of the transistor 293 is connected to ground for the signal voltage by way of a 20 nF capacitor 297 and is further connected to a tap of a series arrangement of a 2200Ω resistor 299 and three diodes 301, the base of the transistor 287 also being connected to this tap by way of a 560Ω resistor 303. The collector of the transistor 287 is connected to the emitters of two transistors 305, 307 and the collector of the transistor 293 is connected to the emitters of two transistors 309, 311. The bases of the transistors 305 and 309 are interconnected, and by way of a series arrangement of 10 nF capacitor 313 and a 390Ω resistor 315 and by way of a delay time correction network comprising a 6.8 pF capacitor 317, a coil 319 having an inductance of 3.5 µH, 6.8 pF capacitor 321 and a 470Ω resistor 323 these bases receive from the collector of the transistor 115 the signal which is predominantly proportional to the first derivative with respect to time of a deflection correction signal.

By way of a 100Ω resistor 325, the bases of the transistors 311 and 309 are connected to the tap, which is grounded for signal voltages by way of a 10 nF capacitor 327, of a voltage divider comprising a 5.6 kΩ resistor 329 and a 18 kΩ resistor 331. Also the bases of the transistors 307 and 311 are connected to this tap by way of a 100Ω resistor 333. The collectors of the transistors 305, 311 are interconnected and connected to the positive supply voltage by way of a 560Ω resistor 335. The collectors of the transistors 307, 309 are interconnected and further connected to the base of a pnp transistor 339 via a resistor 337 and to the collectors of the transistors 305, 311 by way of a variable resistor 341. The emitter of the transistor 339, which operates as an amplifier, is connected to the positive supply voltage by way of a 180Ω resistor 342 and the collector is connected to ground by way of a 560Ω resistor 343 and further to the input 281 of the video output amplifier 283 by way of a 470Ω resistor 345. As a result thereof the amplifier 49 applies to that input 281 of the amplifier 283 the brightness correction signal the amplitude of which is adjustable by means of the resistor 341. As it may be assumed that the operation of the buffer, emitter follower, amplifier, multiplying and delay time correction circuits is known, these circuits will not be described in detail.

Alternatively, the above described picture display devices may be in the form of display devices for signals other than television signals, such as, for example, the display of signs or as a playing-field display device for electronic games.

The different correction signals need not necessarily be directly derived from one another. The above-described relation may alternatively be obtained in different manners.

The deflection correction signal and the other correction signals may alternatively contain other components.

The position correction signal may alternatively be generated in a different, for example, known manner.

Although the above sequence of position correction and deflection correction should be preferred in view of the simple construction of the circuit, that sequence may, if so desired, be changed.

We claim:

1. A picture display device for displaying a video signal on a picture screen of an electron beam type picture display tube to be scanned by means of a deflection circuit, comprising a deflection correction signal generating circuit for obtaining a deflection correction signal from a video signal to be displayed and a signal processing circuit having a brightness correction signal generating circuit for adding to the video signal to be displayed a brightness correction signal which is influenced by a signal which is predominantly proportional to a first derivative with respect to time of the deflection correction signal, to correct for brightness deviation caused by changes in the scanning velocity in response to the deflection correction signals, wherein said brightness correction signal generating circuit comprises a multiplier to which the video signal and a signal which is predominantly proportional to the first derivative with respect to time of the deflection correction signal is applied, so that the brightness correction signal is predominantly proportional to a product of the video signal and the first derivative with respect to time of the deflection correction signal.

2. A picture display device as claimed in claim 1, wherein said signal which is predominantly proportional to the first derivative with respect to time of the deflection correction signal is obtained from the video signal by means of a transversal filter comprising a delay circuit having a centre tap.

3. A picture display device as claimed in claim 1, wherein an input of the multiplier, to which a video signal is applied is coupled to an output of a position correction circuit.

4. A picture display device as claimed in claim 3, wherein said position correction circuit comprises a summing circuit in which a position correction signal obtained from a multiplier is added to the video signal, a signal which is predominantly proportional to a first derivative with respect to time of the video signal and a signal which is predominantly proportional to the deflection correction signal being applied to this multiplier.

5. A picture display device as claimed in claim 4, wherein said deflection correction signal is obtained by means of a transversal filter comprising a summing circuit with three inputs, the input signals at the first and the second inputs coming from the input and output of a delay line to which the video signal is applied being added together with an equal weight ratio and the input signal coming from a centre tap of the said delay line being subtracted with a weight ratio at the second input, and the sum of the weight ratios of the first and the third input being equal to that of the weight ratio of the second input, and the output signal of the summing circuit being applied to deflection means which are additional compared with the normal deflection means of the display tube.

6. A picture display device as claimed in claim 5, wherein said additional deflection means are of the electromagnetic type, in the present case a deflection correction coil, to which there is applied from the summing circuit a voltage which is actually integrated by the action of the deflection correction coil so that the deflection correction current flowing through it is approximately proportional to the first derivative with respect to time of the video signal applied to the delay line.

7. A picture display device as claimed in claim 5, wherein said additional deflection means are of the electromagnetic type in the present case a deflection correction electrode, to which the deflection correction signal obtained from the summing circuit is applied by way of an integrator.

* * * * *